United States Patent

[11] 3,543,798

[72] Inventor Emanuel Briguglio
    Wheaton, Maryland
[21] Appl. No. 743,239
[22] Filed July 8, 1968
[45] Patented Dec. 1, 1970
[73] Assignee Singer-General Precision, Inc.
    Binghamton, New York
    a corporation of Delaware

[54] PNEUMATICALLY CONTROLLED SERVO VALVE
    3 Claims, 1 Drawing Fig.
[52] U.S. Cl. .................................................... 137/625.62,
                                                137/81.5
[51] Int. Cl. ...................................................... F15c 3/02,
                                                F16k 31/12
[50] Field of Search........................................... 137/81.5,
                                            82, 83, 625.62, 625.63

[56]              References Cited
        UNITED STATES PATENTS
3,233,623  2/1966  Glay..............................  137/625.62X
3,407,828  10/1968 Jones.............................  137/81.5
3,444,877  5/1969  Atchley..........................  137/81.5

FOREIGN PATENTS
1,458,767  10/1966  France..........................  137/81.5

Primary Examiner—William R. Cline
Attorneys—Francis L. Masselle and William Grobman ABSTRACT: A control block contains an input, two outputs and two control input ports. Fluid pressure is continuously applied to the system input, and fluid pressure is continuously exhausted from the two outputs in equal amounts. The two output ports expel the exhausted fluid against opposite sides of a vane. Normally, the vane is thereby maintained in a central position. When a fluid pulse is applied to one of the control inputs or the other, the fluid is deflected in the control block so that more is delivered to one output port than to the other. The vane is thereby deflected to one side. The vane is pivoted on a fixed mount at one end and is pivoted on a slideable spool at the other end. When the vane is deflected to one side or the other, the spool is also moved from a central position. The spool contains a plurality of pistons which fit in a cylinder in a valve housing, and when the spool is moved to one side or another, a source of fluid under pressure is connected through an input port to one or the other of a pair of output ports. The direction of movement determines which of the two output ports receives the fluid.

Patented Dec. 1, 1970
3,543,798
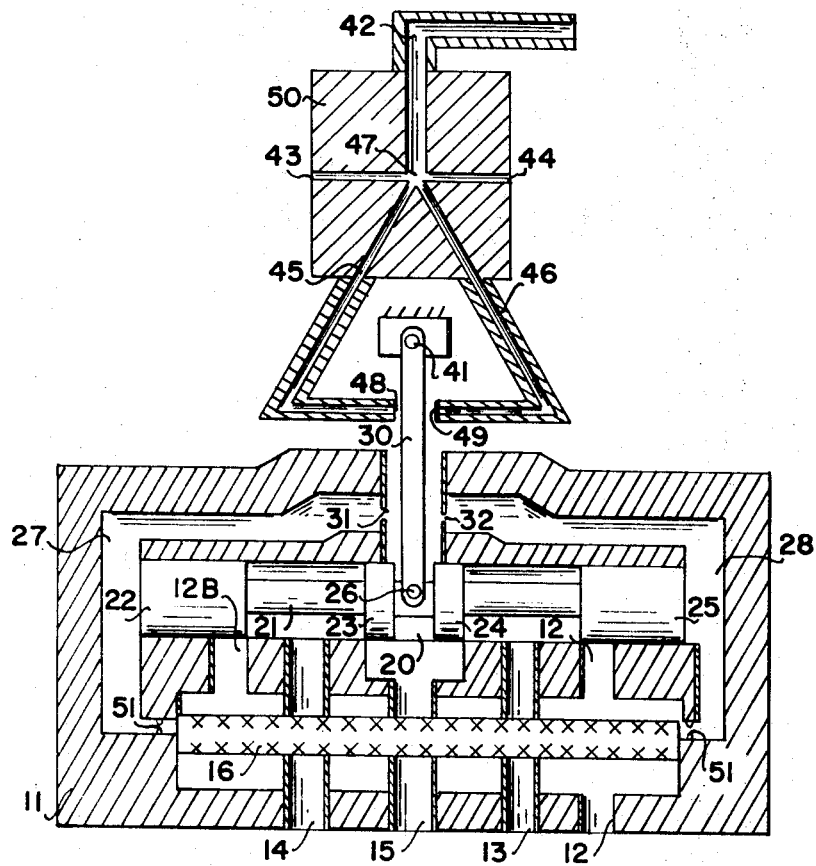
INVENTOR.
EMANUEL BRIGUGLIO
BY
William Grobman

PNEUMATICALLY CONTROLLED SERVO VALVE

This invention relates to control devices and, more particularly, to fluid control systems in which a large fluid pressure or quantity can be simply and accurately controlled by a small, pulsed or proportional analog source of fluid pressure.

Fluid servo systems are becoming more common. In fact, in a large proportion of today's automobiles, the braking system contains a fluid servo assist device. Fluid servo systems have been used for many years as door operators and in many manufacturing and other mechanical systems. However, most of the prior art fluid servo systems have been of the amplifier type where the output is but an amplification of a relatively steady state input. The input was one which varied slightly in pressure in response to such things as the amount of movement of a member to produce an amplified movement or a proportional movement of a larger device or both.

Recently, as the utilization and the requirements of digital computers has expanded, development of digital systems using energy sources other than electricity has also taken place. One of these energy sources is a source of fluid pressure. The field of fluidics has developed as a digital or pulsed fluid system where a source of fluid pressure is controlled by fluid pulses. In most applications of the pulsed fluid systems, amplification is not required other than to overcome losses within the system. However, the applications of pulsed fluid control systems could be increased if the systems would amplify as well as control.

It is an object of this invention to provide a new and improved pulsed fluid control system.

It is another object of this invention to provide a new and improved pulsed fluid control system in which both the input signals and the output fluid signals are pulsed.

It is a further object of this invention to provide a new and improved pulsed fluid control system in which relatively weak fluid pulses control a considerably larger fluid output system.

Other objects and advantages of this invention will become apparent as the following description proceeds, which description should be considered together with the accompanying drawings in which the single FIG. is a schematic showing in section of the fluid control system of this invention.

Referring now to the drawing in detail, the reference character 11 designates a valve housing having a central cavity with partitions mounted therein. The housing 11 includes a fluid supply port 12, a right fluid output port 13, a left fluid output port 14 and a fluid exhaust port 15. The ports 12—15 are connected with the central cavity of the housing 11 by means of a filter 16 and a spool valve which includes a spool 20 having right pistons 24 and 25 and left pistons 22 and 23. The central cavity includes passageways 27 and 28. Passageway 27 terminates externally at one end in a diaphragm having a central opening 31 therethrough and internally at the other end in a small opening 51 which connects with the supply port 12. Similarly, passageway 28 terminates externally at one end in a diaphragm having a central perforation 32, and internally at its other end in a small opening 51 which connects with the supply port 12. The two perforations 31 and 32 face opposite sides of a vane 30 which is pivotally attached to the spool 20 at one end and is mounted on an anchored pivot 41 at the other end. The system also includes a control block 50 having a fluid supply input 42. Within the block 50, the input passage 42 ends in a fork which divides the single input 42 into two identical passages 45 and 46. The passage 45 ends in a tube 48 which terminates adjacent the same side of the vane 30 as the perforation 31, and the passage 46 ends in a tube 49 which terminates adjacent the other side of the vane 30 as does the perforation 32. In addition, two signal input ports 43 and 44 terminate within the block 50 at the fork 47.

The system of this invention will operate as a fluid servo system if the information supplied to the two signal input ports 43 and 44 is in the form of pulses of fluid pressure applied to one or both of the inputs 43 and 44, is in the form of a slowly varying steady-state or continuous fluid pressure applied, say, differentially to the two inputs 43 and 44, or is in the form of a frequency or amplitude modulated continuous fluid pressure applied to one or both of the inputs 43 and 44. For the purposes of this description, it is assumed that information is applied to one of the inputs 43 and 44 at a time in the form of fluid pulses.

In operation with fluid under pressure supplied to the input port 12 and to the fluid input supply 42, fluid passes through the two passages 45 and 46 in the control block 50 and impinges equally on the two sides of the vane 30 from the ends of the tubes 48 and 49. Also, fluid under pressure bleeds through the two small openings 51 from the input port 12, passes through the passageways 27 and 28 in the housing 11, and is expelled equally from the two perforations 31 and 32 against opposite sides of the vane 30. Thus, with fluid from both the control block 50 and the housing 11 impinging equally on the opposite sides of the vane 30, the vane 30 tends to stay in a central position and tends to maintain the spool 20 in a central position. In the central position, the fluid entering the input port 12 is blocked from both of the output ports 13 and 14 by the pistons 25 and 22, and the exhaust port 15 is open to the atmosphere at both ends. In this condition, the system is balanced.

The application of a fluid pulse to either of the signal inputs 43 or 44 unbalances the system and causes an action. Assume that a pulse of fluid is applied to the input 43. The stream of fluid flowing from the supply input 42 to the two outputs 45 and 46 is deflected by the input pulse so that more fluid is forced through the output 46 than through 45. More fluid under pressure is expelled from the output tube 49 than from 48, and the vane 30 is deflected to the left as a result. When the vane 30 moves to the left, it carries with it the spool 20. The piston 22 slides to the left, opening the input port 12 to the output port 14. At the same time, the piston 23 moves to the left, better sealing the output port 14 from the exhaust port 15. The movement of the spool 20 does not affect any connection between the supply port 12 and the output port 13, but it does open output port 13 to the atmosphere to a greater extent. When the input pulse applied to the input 43 decays, the system returns to its balanced condition with both the vane 30 and the spool 20 in their intermediate central positions. The application of a subsequent pulse to the other signal input 44 produces the opposite action connecting the supply port 12 to the output port 13.

If the supply port 12, which is shown on the right side of the housing 11, is connected to a similar chamber 12B on the left side of the housing 11 by a small passage with limited fluid passing capacity, then as the spool 20 is moved to the left, as discussed above, and the port 12B is opened to the output port 14, the fluid pressure in the port 12B drops, decreasing the amount of fluid passing through the left opening 51 and into the passage 27. This decreases the centering effect of the fluid being expelled from the perforation 31, and permits the further movement of the vane 30 to the left. In fact, the system may be made self-latching in this manner.

The above specification has described a new and improved servo system in which a small pulse of fluid under pressure actuates a valve to open a larger source of fluid under pressure for delivery to a utilizing device. The system of this invention operates in opposite directions to permit the control of two separate outputs by two separate inputs. It is realized that the above description may indicate to others skilled in the art additional ways in which this equipment can be used without departing from its principles.

I claim:

1. A fluid servo valve comprising a valve block and a control block, said valve block comprising a housing having a central chamber, a valve body in said chamber, a first input port and a second input port communicating with said chamber, a first output port and a second output port communicating with said chamber, said valve having a first valve portion interposed between said first input and output ports, said valve having a second valve portion interposed between said second input and output ports, a vane connected to said valve body, means within said housing for supplying fluid under pressure to both sides of said vane in substantially equal quantities to maintain said vane and said valve body in a neutral position in which said first and second valve portions prevent communication between said respective input and output ports, said control block comprising a primary input port for supplying fluid under pressure to the interior of said control block, a first and a second control output port, means within said control block for equally dividing fluid supplied to said primary input port between said first and second control output ports, said first and second control output port being arranged on either side of said vane, and means for deflecting fluid supplied to said primary input port so that it is no longer equally divided between said first and second control output ports to cause said vane to be deflected moving said valve body accordingly to permit an input port to be connected to its respective output port.

2. The servo valve defined in claim 1 wherein said means in said control block for equally dividing fluid supplied thereto comprises a single primary conduit having as its input said primary input port, a pair of secondary conduits having as their respective outputs said first and second output ports, and a substantially sharp barrier interposed between said secondary conduits and at the center of the end of said primary conduit to divide the fluid stream in said primary conduit.

3. The servo valve defined in claim 2 wherein said deflecting means comprises a pair of tertiary conduits in said control block, one of said tertiary conduits penetrating said control block to said primary conduit immediately before and to one side of said sharp barrier, the other of said tertiary conduits penetrating said control block to said primary conduit immediately before and to the other side of said sharp barrier so that a fluid injected into one of said tertiary conduits will cause the fluid passing through said primary conduit to pass unequally through said secondary conduits.